(12) United States Patent
Nickerson et al.

(10) Patent No.: US 12,236,537 B2
(45) Date of Patent: Feb. 25, 2025

(54) SPATIALLY AWARE ENVIRONMENT RELOCALIZATION

(71) Applicant: ARKH, Inc., Dallas, TX (US)

(72) Inventors: Landon Nickerson, Dallas, TX (US); Sean Ong, Tukwila, WA (US); Preston McCauley, Dallas, TX (US)

(*) Notice: Subject to any disclaimer, the term of this patent is extended or adjusted under 35 U.S.C. 154(b) by 71 days.

(21) Appl. No.: 17/555,267

(22) Filed: Dec. 17, 2021

(65) Prior Publication Data

US 2022/0198764 A1    Jun. 23, 2022

Related U.S. Application Data

(60) Provisional application No. 63/127,532, filed on Dec. 18, 2020.

(51) Int. Cl.
| | |
|---|---|
| *G06T 19/00* | (2011.01) |
| *G06F 3/01* | (2006.01) |
| *G06T 7/70* | (2017.01) |
| *G06V 20/20* | (2022.01) |

(52) U.S. Cl.
CPC ............ *G06T 19/006* (2013.01); *G06F 3/011* (2013.01); *G06T 7/70* (2017.01); *G06V 20/20* (2022.01)

(58) Field of Classification Search
CPC ..... G06T 19/006; G06T 7/70; G06T 2210/04; G06F 3/011; G06V 20/20; G06V 20/10
See application file for complete search history.

(56) References Cited

U.S. PATENT DOCUMENTS

| | | |
|---|---|---|
| 5,945,978 A | 8/1999 | Holmes |
| 7,215,321 B2 | 5/2007 | SanGiovanni |
| 7,716,586 B2 | 5/2010 | Dieberger et al. |
| 8,031,172 B2 | 10/2011 | Kruse et al. |
| 8,232,976 B2 | 7/2012 | Yun et al. |
| 8,378,795 B2 | 2/2013 | Steger et al. |
| 8,599,152 B1 | 12/2013 | Wurtenberger et al. |
| 8,698,764 B1 | 4/2014 | Karakotsios et al. |
| 8,799,803 B2 | 8/2014 | Amm |
| 8,809,716 B2 | 8/2014 | Gohng et al. |
| 8,830,163 B2 | 9/2014 | Sim et al. |
| 8,860,763 B2 | 10/2014 | Privault et al. |
| 9,030,424 B2 | 5/2015 | Shih et al. |
| 9,141,148 B2 | 9/2015 | Richter et al. |
| 9,141,272 B1 | 9/2015 | Cleron et al. |
| 9,229,540 B2 | 1/2016 | Mandella et al. |
| 9,268,483 B2 | 2/2016 | Dennis et al. |

(Continued)

FOREIGN PATENT DOCUMENTS

| | | | | |
|---|---|---|---|---|
| CN | 108399010 A | * | 8/2018 | ......... G06F 3/04842 |
| WO | WO 2019/183593 A1 | * | 9/2019 | ........... G06F 3/0346 |
| WO | WO 2019/236588 A1 | * | 12/2019 | ........... G01C 21/383 |

*Primary Examiner* — Ryan R Yang
(74) *Attorney, Agent, or Firm* — Conley Rose, P.C.; Grant Rodolph; Robert E. Kent

(57) ABSTRACT

In some examples, a method includes determining, via a user device, three-dimensional spatial data for a physical environment, determining a geographic location of the physical environment, assigning a Spatial Anchor in the physical environment, and creating a digital element in an augmented reality environment created based on the spatial data of the physical environment, the digital element located in the augmented reality environment relative to a position of the Spatial Anchor.

20 Claims, 5 Drawing Sheets

(56) References Cited

U.S. PATENT DOCUMENTS

| | | |
|---|---|---|
| 9,330,545 B2 | 5/2016 | Kempin et al. |
| 9,335,790 B2 | 5/2016 | Stotler |
| 9,335,823 B2 | 5/2016 | Modarres et al. |
| 9,383,839 B1 | 7/2016 | Rost et al. |
| 9,412,002 B2 | 8/2016 | Magi |
| 9,446,665 B2 | 9/2016 | Abel et al. |
| 9,474,580 B2 | 10/2016 | Hannaford et al. |
| 9,535,550 B2 | 1/2017 | Levesque et al. |
| 9,535,557 B2 | 1/2017 | Bernstein et al. |
| 9,547,366 B2 | 1/2017 | Ullrich et al. |
| 9,600,076 B2 | 3/2017 | Levesque et al. |
| 9,600,083 B2 | 3/2017 | Levesque et al. |
| 9,606,624 B2 | 3/2017 | Cruz-Hernandez et al. |
| 9,645,647 B2 | 5/2017 | Levesque |
| 9,690,377 B2 | 6/2017 | Lee et al. |
| 9,690,381 B2 | 6/2017 | Levesque et al. |
| 9,690,382 B1 | 6/2017 | Moussette et al. |
| 9,696,822 B2 | 7/2017 | Dow et al. |
| 9,713,500 B2 | 7/2017 | Kim et al. |
| 9,746,921 B2 | 8/2017 | Mallinson |
| 9,746,933 B2 | 8/2017 | Burba et al. |
| 9,778,813 B2 | 10/2017 | Shenfield et al. |
| 9,785,123 B2 | 10/2017 | Mansour et al. |
| 9,792,272 B2 | 10/2017 | Hicks |
| 9,798,388 B1 | 10/2017 | Murali |
| 9,830,782 B2 | 11/2017 | Morrell et al. |
| 9,880,697 B2 | 1/2018 | Anderson et al. |
| 9,891,709 B2 | 2/2018 | Heubel |
| 9,904,409 B2 | 2/2018 | Lee et al. |
| 9,927,902 B2 | 3/2018 | Burr et al. |
| 9,939,963 B2 | 4/2018 | Beckman |
| 9,945,818 B2 | 4/2018 | Ganti et al. |
| 9,946,505 B2 | 4/2018 | Becze et al. |
| 9,965,033 B2 | 5/2018 | Park et al. |
| 10,007,772 B2 | 6/2018 | Slaby et al. |
| 10,061,458 B1 | 8/2018 | Bristol et al. |
| 10,065,114 B2 | 9/2018 | Goetgeluk et al. |
| 10,088,902 B2 | 10/2018 | Keller et al. |
| 10,126,779 B2 | 11/2018 | von Badinski et al. |
| 10,126,941 B2 | 11/2018 | Zhu et al. |
| 10,146,308 B2 | 12/2018 | Cruz-Hernandez et al. |
| 10,183,217 B2 | 1/2019 | Chen et al. |
| 10,185,670 B2 | 1/2019 | Litichever et al. |
| 10,216,272 B2 | 2/2019 | Keller et al. |
| 10,331,777 B2 | 6/2019 | Hicks et al. |
| 10,346,038 B2 | 7/2019 | England et al. |
| 10,372,221 B2 | 8/2019 | Robert et al. |
| 10,372,270 B2 | 8/2019 | Hoggarth et al. |
| 10,386,960 B1 | 8/2019 | Smith |
| 10,416,774 B2 | 9/2019 | Weddle et al. |
| 10,437,337 B2 | 10/2019 | Park |
| 10,444,834 B2 | 10/2019 | Vescovi et al. |
| 10,490,035 B2 | 11/2019 | Morrell et al. |
| 10,496,193 B1 | 12/2019 | Alfano et al. |
| 10,496,235 B2 | 12/2019 | Woley et al. |
| 10,503,454 B2 | 12/2019 | Sirpal et al. |
| 10,509,469 B2 | 12/2019 | Erivantcev et al. |
| 10,514,780 B2 | 12/2019 | Su et al. |
| 10,514,831 B2 | 12/2019 | Sirpal et al. |
| 10,514,877 B2 | 12/2019 | Becze |
| 10,528,230 B2 | 1/2020 | Sirpal et al. |
| 10,528,312 B2 | 1/2020 | Reeves |
| 10,534,447 B2 | 1/2020 | Li |
| 10,540,052 B2 | 1/2020 | Gimpl et al. |
| 10,540,087 B2 | 1/2020 | Sirpal et al. |
| 10,545,580 B2 | 1/2020 | Yang et al. |
| 10,545,712 B2 | 1/2020 | Reeves et al. |
| 10,547,716 B2 | 1/2020 | Jeon et al. |
| 10,552,007 B2 | 2/2020 | Sirpal et al. |
| 10,558,321 B2 | 2/2020 | Reeves et al. |
| 10,558,414 B2 | 2/2020 | Reeves et al. |
| 10,558,415 B2 | 2/2020 | de Paz |
| 10,572,095 B2 | 2/2020 | Sirpal et al. |
| 10,579,099 B2 | 3/2020 | Wang et al. |
| 10,592,061 B2 | 3/2020 | Sirpal et al. |
| 10,599,218 B2 | 3/2020 | Saboune et al. |
| 10,606,359 B2 | 3/2020 | Levesque et al. |
| 10,627,902 B2 | 4/2020 | Vescovi et al. |
| 10,652,383 B2 | 5/2020 | Selim |
| 10,664,121 B2 | 5/2020 | Sirpal et al. |
| 10,664,129 B2 | 5/2020 | Lee et al. |
| 10,678,411 B2 | 6/2020 | Reeves et al. |
| 10,684,478 B2 | 6/2020 | Osterhout |
| 10,698,486 B2 | 6/2020 | Reynolds et al. |
| 10,705,674 B2 | 7/2020 | Gimpl et al. |
| 10,706,251 B2 | 7/2020 | Shim et al. |
| 10,713,907 B2 | 7/2020 | Anderson et al. |
| 10,716,371 B2 | 7/2020 | Ward |
| 10,719,191 B2 | 7/2020 | Sirpal et al. |
| 10,719,232 B2 | 7/2020 | Tse |
| 10,740,058 B2 | 8/2020 | Sirpal et al. |
| 10,768,747 B2 | 9/2020 | Wang et al. |
| 10,775,891 B2 | 9/2020 | Sinclair et al. |
| 10,795,448 B2 | 10/2020 | Miller |
| 10,803,281 B2 | 10/2020 | Han et al. |
| 10,831,358 B2 | 11/2020 | Webber |
| 10,845,938 B2 | 11/2020 | Sirpal et al. |
| 10,849,519 B2 | 12/2020 | Mendenhall et al. |
| 10,852,154 B1 | 12/2020 | Knas et al. |
| 10,852,700 B2 | 12/2020 | Abramov |
| 10,853,013 B2 | 12/2020 | Sirpal et al. |
| 10,853,016 B2 | 12/2020 | Sirpal et al. |
| 10,871,871 B2 | 12/2020 | Cassar et al. |
| 10,893,833 B2 | 1/2021 | Harverinen et al. |
| 10,915,214 B2 | 2/2021 | Sirpal et al. |
| 10,922,870 B2 | 2/2021 | Vaganov |
| 10,942,615 B2 | 3/2021 | Helmes et al. |
| 10,949,051 B2 | 3/2021 | Sirpal et al. |
| 10,955,974 B2 | 3/2021 | Griffin |
| 10,963,007 B2 | 3/2021 | de Paz et al. |
| 10,964,178 B2 | 3/2021 | Aleksov et al. |
| 10,976,820 B2 | 4/2021 | Ganadas et al. |
| 10,976,822 B2 | 4/2021 | Dogiamis et al. |
| 10,983,559 B2 | 4/2021 | Reeves et al. |
| 10,990,242 B2 | 4/2021 | Sirpal et al. |
| 11,010,047 B2 | 5/2021 | Sirpal et al. |
| 11,061,476 B2 | 7/2021 | Remaley et al. |
| 11,073,826 B2 | 7/2021 | Cella et al. |
| 11,093,200 B2 | 8/2021 | Reeves et al. |
| 11,093,769 B2 | 8/2021 | Dow et al. |
| 11,106,355 B2 | 8/2021 | Kolondra et al. |
| 11,119,633 B2 | 9/2021 | Yamamoto |
| 11,132,161 B2 | 9/2021 | de Paz |
| 11,137,796 B2 | 10/2021 | Sirpal et al. |
| 11,151,234 B2 | 10/2021 | Kontsevich et al. |
| 11,163,417 B2 * | 11/2021 | Hauenstein ............ G06F 3/011 |
| 11,182,046 B2 | 11/2021 | Sirpal et al. |
| 11,221,646 B2 | 1/2022 | Sirpal et al. |
| 11,221,647 B2 | 1/2022 | Sirpal et al. |
| 11,221,649 B2 | 1/2022 | Sirpal et al. |
| 11,226,710 B2 | 1/2022 | Sirpal et al. |
| 11,231,786 B1 | 1/2022 | Elangovan |
| 11,243,521 B2 | 2/2022 | Cella et al. |
| 11,262,792 B2 | 3/2022 | de Paz et al. |
| 2012/0249544 A1 * | 10/2012 | Maciocci ................ G06F 3/147 345/419 |
| 2012/0249741 A1 * | 10/2012 | Maciocci .............. G06T 19/006 348/51 |
| 2015/0046252 A1 * | 2/2015 | Hart ................... G06Q 30/0643 705/14.58 |
| 2015/0054823 A1 * | 2/2015 | Dzhurinskiy ......... G06T 19/006 345/419 |
| 2015/0097827 A1 * | 4/2015 | Cohen .................... G06T 5/005 345/420 |
| 2017/0076505 A1 * | 3/2017 | Gavriliuc ............. G03H 1/0005 |
| 2017/0109930 A1 * | 4/2017 | Holzer .................... G06T 13/20 |
| 2018/0020421 A1 * | 1/2018 | Kumar .................... H04W 4/33 |
| 2018/0107805 A1 * | 4/2018 | Anantharaman ........ G06F 3/011 |
| 2018/0182025 A1 * | 6/2018 | Smith ................. G06Q 30/0623 |
| 2018/0268582 A1 * | 9/2018 | Schneider ............... G06T 11/60 |
| 2018/0321894 A1 * | 11/2018 | Paulovich .......... G02B 27/0172 |
| 2019/0107396 A1 * | 4/2019 | Tan ........................ H04B 17/27 |
| 2019/0333288 A1 * | 10/2019 | Smet ................... G06T 19/006 |
| 2020/0020164 A1 * | 1/2020 | Coffman ............... G06T 19/006 |

(56) References Cited

U.S. PATENT DOCUMENTS

| | | | |
|---|---|---|---|
| 2020/0097770 A1* | 3/2020 | Sommer | G06F 18/2148 |
| 2020/0111255 A1* | 4/2020 | Brodsky | G06F 3/017 |
| 2020/0111256 A1* | 4/2020 | Bleyer | G06F 3/011 |
| 2020/0279392 A1* | 9/2020 | Shamir | G06F 3/0304 |
| 2020/0304375 A1* | 9/2020 | Chennai | G06T 17/05 |
| 2020/0326831 A1* | 10/2020 | Marr | G06F 3/04883 |
| 2020/0349735 A1* | 11/2020 | Dine | G06T 19/00 |
| 2021/0042992 A1* | 2/2021 | Newman | G06T 19/006 |
| 2021/0056762 A1* | 2/2021 | Robbe | G06F 16/2282 |
| 2021/0327146 A1* | 10/2021 | Buerli | G06F 3/04815 |
| 2022/0108534 A1* | 4/2022 | You | G06T 19/003 |
| 2022/0237875 A1* | 7/2022 | Wu | G06V 20/20 |

* cited by examiner

SPATIALLY AWARE ENVIRONMENT RELOCALIZATION

CROSS-REFERENCE TO RELATED APPLICATIONS

This application claims priority to U.S. Provisional Application No. 63/127,532 filed Dec. 18, 2020 by Landon Nickerson, et al., entitled "Spatially Aware Environment Relocalization", which is incorporated by reference herein as if reproduced in its entirety.

BACKGROUND

Augmented reality (AR) technologies enable a merging of digital content and our physical environment. Through AR, digital content may be superimposed over our physical environment. Through AR, actions that we take in our physical environment may be processed digitally.

SUMMARY

In some examples, a method includes determining, via a user device, three-dimensional spatial data for a physical environment, determining a geographic location of the physical environment, assigning a Spatial Anchor in the physical environment, and creating a digital element in an augmented reality environment created based on the spatial data of the physical environment, the digital element located in the augmented reality environment relative to a position of the Spatial Anchor.

In some examples, a method includes determining a geographic location of a computing device, the geographic location of the computing device approximating a geographic location of a physical environment, transmitting the geographic location to a server having access to one or more spatial map files, receiving a spatial map file corresponding to the geographic location, determining position and rotation information of a Spatial Anchor in the physical environment as specified in the received spatial map file, and generating an augmented reality environment based on the spatial map file by locating digital content indicated in the spatial map file at locations determined relative to the determined position and rotation of the Spatial Anchor.

In some examples, a system includes a spatial computing device configured to generate a spatial map file for an environment proximate to the spatial computing device, the spatial computing device localized in the environment as represented in the spatial map file, and transmit the spatial map file to a spatial computing hub. The system also includes the spatial computing hub, communicatively coupled to the spatial computing device, wherein the spatial computing hub is configured to maintain and persist digital assets in the spatial map file, the digital assets having positions determined by multiple users.

BRIEF DESCRIPTION OF THE DRAWINGS

For a more complete understanding of this disclosure, reference is now made to the following brief description, taken in connection with the accompanying drawings and detailed description, wherein like block numerals represent like parts.

DETAILED DESCRIPTION

Figure 1:
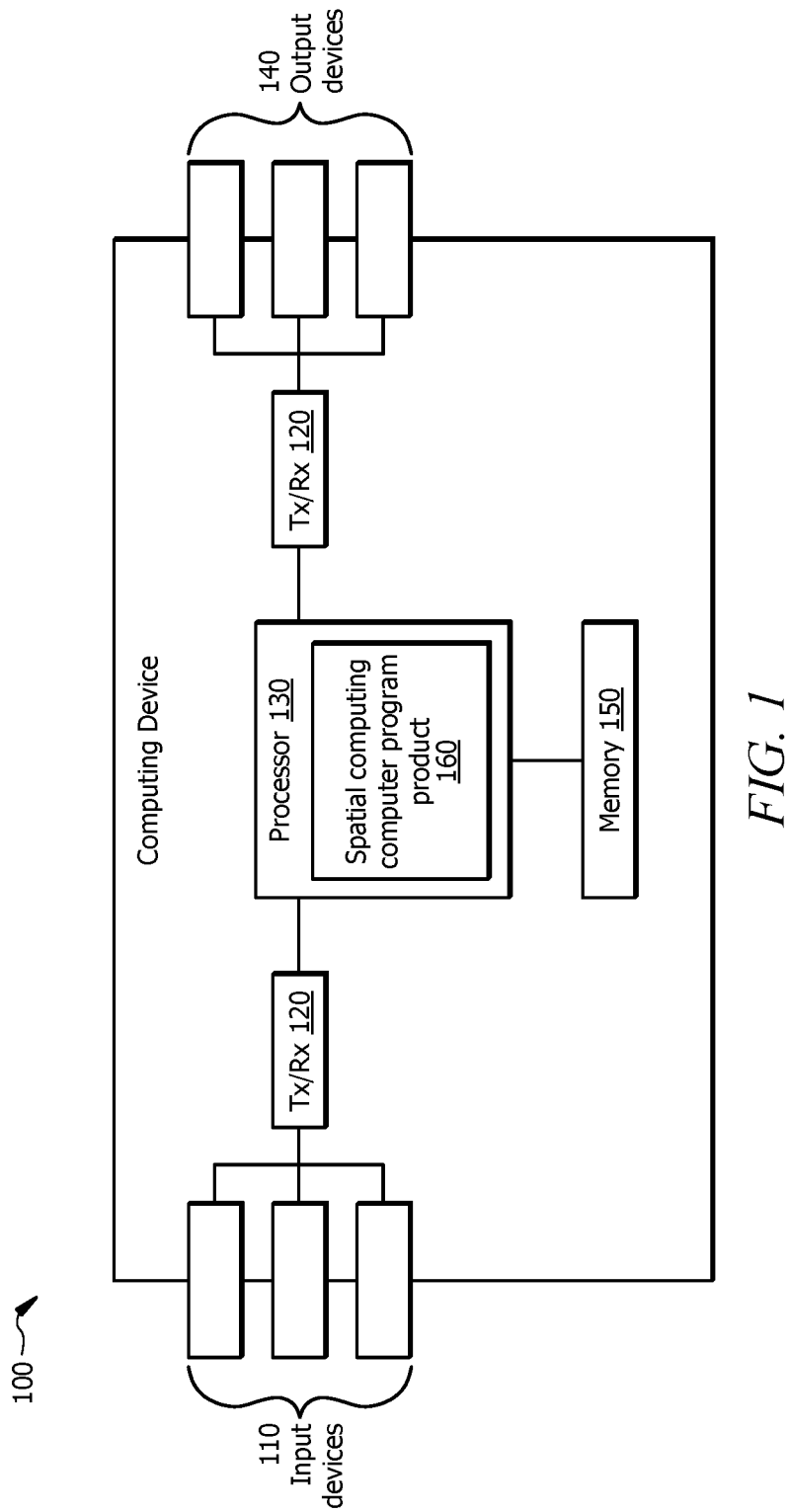
FIG. 1 is a block diagram of an example computing device in accordance with aspects of the disclosure.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Some technologies exist for placing digital content in a physical environment when viewed through a viewfinder, such as the screen of a smart device (e.g., smartphone, tablet, wearable device, etc.) in an AR session. However, challenges may exist in having the placement of this digital content persist from one AR session to another, or from one device to another.

Disclosed herein is a spatial computing device and spatial computing scheme in which spatial data and information linking the placement of digital content to that spatial data is stored together in a generated spatial map file. The spatial map file may be generated at least partially as an output of a simultaneous localization and mapping (SLAM) process, such as generated by a SLAM capable device (which may be the spatial computing device). For example, the SLAM capable device may be a smartphone, tablet, or other device having light detection and ranging (LIDAR) functionality, radar functionality, a camera, or any other sensors or components that enable the SLAM capable device of generating data representative of a three-dimensional (3D) space. Such data capture may be performed according to any suitable means for 3D spatial data capture, the scope of which is not limited herein. The data may form, or be based on the data a spatial computing hub may generate, a 3D spatial map of the environment in which the spatial computing device is located and which has been scanned or otherwise processed by the SLAM capable device to generate the data. The 3D spatial map is, in at least some examples, a map of a space that was scanned by the SLAM capable device, such as a room of a home, multiple rooms of a home, areas of a retail environment, etc. The spatial computing hub may be a server or other device that performs spatial computing and/or communicates with the spatial computing device to create, update, maintain, provide, or otherwise interact with the 3D spatial map.

After receiving the spatial map, the spatial computing hub computes spatial data for the environment, establishing itself as a point of origin in the spatial map. For example, the spatial computing device utilizes ultra-wideband, Bluetooth, and/or wireless radio wave technologies to localize electronic devices (such as Internet-enabled, Internet of Things devices, or any device that can send or receive a wireless signal and/or is capable of electronically communicating with the spatial computing device) within the environment and position them within the spatial map. For example, the electronic devices may be localized in the environment based on signal processing including Time of Flight, Time of Arrival, Fine Time Measurement, wireless signal triangulation including the electronic device, the spatial computing device, and at least one other device, etc. The electronic devices are located in the spatial map relative to the point of origin (e.g., the spatial computing device) and are tracked substantially continuously to maintain accurate spatial data for the environment. In this way, the spatial computing hub maintains a spatial and situational awareness of the environment and the electronic devices (e.g., the spatial computing device) within the environment. In at least some examples, the 3D spatial map is also, or alternatively, stored on a server located outside the environment (e.g., on a server other than the spatial computing hub) which may be accessible to devices other than the spatial computing device and/or to multiple users.

In at least some examples, the 3D spatial map is stored as, or in, a spatial map file. The spatial map file, in at least some examples, includes spatial data for a location. In some examples, the spatial map file may also include elements that enable a device that accesses the spatial map file, or has the 3D spatial map stored locally, to re-localize itself within the 3D spatial map. The relocalization may be performed using any one or more suitable localization methods, such as global positioning satellites (GPS), Time-of-flight calculations, acoustic positioning, radio or radio wave triangulation, image recognition, computer vision, or various anchoring methods or systems. In some examples, the spatial map file is a single file, while in other examples the spatial map file is instead a collection of interrelated, but separate, files that together function as or form the spatial map file. In various examples, the 3D spatial map may be stored in the spatial map as point cloud data, voxel data, one or more meshes, and/or any other suitable types of spatial data that enable recreation or reconstruction digitally of the physical environment from which the 3D spatial map resulted. The spatial map file may include full color information to enable a full-color, or partial-color recreation or reconstruction digitally of the physical environment from which the 3D spatial map resulted, or the spatial map file may include black and white, or grayscale, color information.

In some examples, via an interface of the spatial computing device, digital content may be placed into the spatial map by a user. Alternatively, the spatial computing device or the spatial computing hub may perform processing on the spatial map to identify certain structures, signs, locations, or any other identifiable elements of the spatial map and digital content may be placed into the spatial map based on the identified elements automatically without a user specifically placing the digital content. For example, signs located in the spatial map and resulting from the data provided by the SLAM capable device may be replaced in the spatial map with interactive digital content. In other examples, elements located in the spatial map and resulting from the data provided by the SLAM capable device may be used as landmarks to guide placement of digital content (e.g., a table may be identified and digital content placed on top of the table, walls identified and digital wallpaper added to the walls automatically, etc.). The spatial computing device may include executable code that implements a Live View function. The Live View function may enable a user to view the spatial map through a screen or other viewfinder of the spatial computing device. While viewing the spatial map, the user may interact with the spatial computing device to place digital content into the spatial map corresponding to certain locations in the spatial map or modify previously placed digital content, such as by the user previously, by another user, or automatically without user input. The location of the digital content may be transmitted to the spatial computing hub and stored by the spatial computing hub in the spatial map file so that it may be later recalled by the user using the spatial computing device, or another device, or recalled by other users using the spatial computing device, or other devices.

In at least some implementations of the spatial map file, numerous types and formats of data are stored. For example, coordinate data for each mesh and/or plane object scanned by the SLAM capable device and included in the 3D spatial data may be stored. The coordinate data may include vector3 data (e.g., x, y, and z-axis coordinates) for positional data and quaternion data (x, y, z, and w-axis coordinates) for rotation data. Positional data and rotation data for digital content added to the spatial map by a user, or automatically, may also be stored in the spatial map as a combination of vector3 and quaternion data. In at least some examples, locational information, when available, is also stored in the spatial map to indicate a location from which the spatial map was generated. The location information could be GPS coordinates stored as latitude and longitude values, latitude and longitude values determined according to radio signal triangulation, or any other suitable location information.

When an anchor is first created in the physical environment from which the 3D spatial data is captured, an Azure Spatial Anchor Identification (ID) may be created. In some examples, the anchor may be placed by a user. In other examples, the anchor may be automatically placed without specific action of the user to place the anchor. Azure is a software product offered by MICROSOFT. The Azure Spatial Anchor ID may be associated with the anchor (e.g., be a unique ID of the anchor) and may be stored in the spatial map file as a string or any other suitable data type. In addition to the position and location data defining a location of each digital content object added to the spatial map, as discussed above, each digital content object may be further associated with various properties. These properties can include a scale of the digital content object, a texture of the digital content object, a classification of the digital content object, or any other aesthetic or functional properties of the digital content object. The properties of the digital content object may be stored in the spatial map file as any suitable data type or in any suitable data format or structure, such as a string, a float (floating point number), an integer number, etc. The digital content objects added to the spatial map may be positioned relative to the Spatial Anchor, created as described above.

When the spatial map is subsequently accessed on a spatial computing device, either by the user who captured the 3D spatial data or by another user, such as via the Live View functionality discussed above, location data of the user accessing the spatial map may be determined and transmitted, sometimes along with an identification of the user accessing the spatial map, to the spatial computing hub (or other server hosting the spatial map file). In at least some examples, the location information is transmitted to the spatial computing hub via one or more application programming interface (API) calls to the spatial computing hub. In some examples, the location data includes GPS location data or radio triangulation location data. In other examples, the location data includes a photograph or other 3D spatial data captured when the spatial map is subsequently accessed. Based on the location data, the spatial computing hub may re-localize the spatial computing device in the spatial map.

As discussed above, in some examples the spatial computing device may transmit a photograph or other 3D spatial data captured when the spatial map is subsequently accessed. The photograph or other 3D spatial data may include the Spatial Anchor created above. The spatial computing device, or the spatial computing hub, may provide the Azure Spatial Anchor ID to an Azure Spatial Anchor API which, in some examples, may be hosted on a third-party server. In at least some examples, the photograph or other 3D spatial data may also be provided to the Azure Spatial Anchor API. Based on the Spatial Anchor identified by the Azure Spatial Anchor ID and the photograph or other 3D spatial data, the Azure Spatial Anchor API may determine a location of the Spatial Anchor, including a position and rotation of the Spatial Anchor. In at least some examples, the spatial computing device may continue capturing images of the physical environment in which the spatial computing device is located, and providing the images to the Azure Spatial Anchor API, until the Azure Spatial Anchor API identifies and determines the location of the Spatial Anchor in one of the captured images.

Based on the determined position and rotation of the Spatial Anchor, the spatial computing hub may populate the spatial map with digital content appropriate for the user. Digital content that is appropriate for the user may be digital content that the user has permission to access, that the user has previously placed in the spatial map, that another user has placed in the spatial map and shared with the first user, that a third-party (e.g., vendor, advertiser, store owner, etc.) has placed in the spatial map, and the like. The spatial computing hub may populate the spatial map with the digital content by placing the digital content in positions and rotations relative to the detected position and rotation of the Spatial Anchor. In at least some examples, the positions and rotations of the digital content relative to the detected position and rotation of the Spatial Anchor may be obtained by the spatial computing hub from the spatial map file. After populating the spatial map with the digital content and/or before displaying the digital content to the user via a viewfinder or screen of the spatial computing device, the spatial computing hub may also apply various properties to the digital content, such as scaling, textures, classification, interactivity, etc.

In at least some examples, re-localizing the spatial computing device in the physical environment (or in the spatial map displayed via the spatial computing device) includes coarse and fine location determinations. For example, coarse location determinations may be location determinations that are less precise than fine location determinations. Examples of coarse location determinations include GPS locations, Time-of-flight calculations, acoustic positioning, and/or radio or radio wave triangulation. Examples of fine location determination include image recognition, comparison, and matching, computer vision, or various anchoring methods or systems such as the Spatial Anchor discussed herein. In at least some implementations of a re-localizing scheme, the spatial computing device is first generally positioned within the physical environment or the spatial map according to a coarse location determination and then further positioned within the physical environment or the spatial map according to a fine location determination, and at least partially according to information obtained via the coarse location determination.

Referring now to FIG. 1, a block diagram of an example computing device 100 is shown. Computing device 100 is any suitable processing device capable of performing the functions disclosed herein such as a processing device, a user equipment, a smartphone, a wearable computing device, a tablet computing device, an Internet of Things (IoT) device, a computer system, a server, a computing resource, a cloud-computing node, a cognitive computing system, etc. In at least some examples, the computing device 100 is suitable for implementation as a spatial computing device or a spatial computing hub, each as described herein. Computing device 100 is configured to implement at least some of the features disclosed herein, for example, the spatially aware computing described herein, including the capturing of 3D spatial data, the creation, storing, and hosting of a spatial map file, presenting a Live View application to a user to create an AR environment, re-localizing a device in an AR environment, etc. In various embodiments, for instance, the features of this disclosure are implemented using hardware, firmware, and/or software (e.g., such as software modules) installed to run on hardware. In some embodiments, the software utilizes one or more software development kits (SDKs) or SDK functions to perform at least some of the features/methods of this disclosure.

In some examples, the computing device 100 is an all-in-one device that performs each of the aforementioned operations of the present disclosure, or the computing device 100 is a node that performs any one or more, or portion of one or more, of the aforementioned operations. In one embodiment, the computing device 100 is an apparatus and/or system configured to implement a spatially aware computing environment, according to a computer program product executed on, or by, at least one processor.

The computing device 100 comprises one or more input devices 110. Some of the input devices 110 include at least some of cameras, magnetic sensors, temperature sensors, pressure sensors, accelerometers, microphones, keyboards, touchscreens, buttons, toggle switches, and/or other devices that allow a user to interact with, and/or provide input actively or passively to, the computing device 100. Some of the input devices 110 are downstream ports coupled to a transceiver (Tx/Rx) 120, which are transmitters, receivers, or combinations thereof. The Tx/Rx 120 transmits and/or receives data to and/or from other computing or electronic devices via at least some of the input devices 110. Similarly, the computing device 100 comprises a plurality of output devices 140. Some of the output devices 140 include at least some of speakers, a display screen (which, in some examples, is also an input device such as a touchscreen), lights, or any other device that allows a user to interact with, and receive output from, the computing device 100. At least some of the output devices 140 are upstream ports coupled to another Tx/Rx 120, wherein the Tx/Rx 120 transmits and/or receives data from other nodes via the upstream ports. The downstream ports and/or the upstream ports include electrical and/or optical transmitting and/or receiving components. In another embodiment, the computing device 100 comprises one or more antennas (not shown) coupled to the Tx/Rx 120. In yet other embodiments, the computing device 100 includes additional Tx/Rx 120 such that the computing device 100 has multiple networking or communication interfaces, for example, such that the computing device 100 communicates with a first device using a first communication interface (e.g., such as via the Internet) and communicates with a second device using a second communication interface (e.g., such as another computing device 100 without using the Internet).

A processor 130 is coupled to the Tx/Rx 120 and at least some of the input devices 110 and/or output devices 140 and is configured to implement the spatial computing environment. In an embodiment, the processor 130 comprises one or more multi-core processors and/or memory modules 150, which functions as data stores, buffers, etc. The processor 130 is implemented as a general processor or as part of one or more application specific integrated circuits (ASICs), field-programmable gate arrays (FPGAs), and/or digital signal processors (DSPs). Although illustrated as a single processor, the processor 130 is not so limited and alternatively comprises multiple processors. The processor 130 further comprises processing logic configured to execute a spatial computing computer program product 160 that is configured to perform spatial computing and/or implement the spatial computing environment (e.g., such as capturing of data to form a spatial map file and or re-localizing of a spatial computing device in an AR environment) as described herein.

FIG. 1 also illustrates that a memory module 150 is coupled to the processor 130 and is a non-transitory medium configured to store various types of data. Memory module 150 comprises memory devices including secondary storage, read-only memory (ROM), and random access memory (RAM). The secondary storage is typically comprised of one or more disk drives, optical drives, solid-state drives (SSDs), and/or tape drives and is used for non-volatile storage of data and as an over-flow storage device if the RAM is not large enough to hold all working data. The secondary storage is used to store programs that are loaded into the RAM when such programs are selected for execution. The ROM is used to store instructions and perhaps data that are read during program execution. The ROM is a non-volatile memory device that typically has a small memory capacity relative to the larger memory capacity of the secondary storage. The RAM is used to store volatile data and perhaps to store instructions. Access to both the ROM and RAM is typically faster than to the secondary storage.

The memory module 150 houses the instructions for carrying out the various embodiments described herein. For example, the memory module 150 comprises the spatial computing computer program product 160, which is executed by processor 130.

Figure 2:
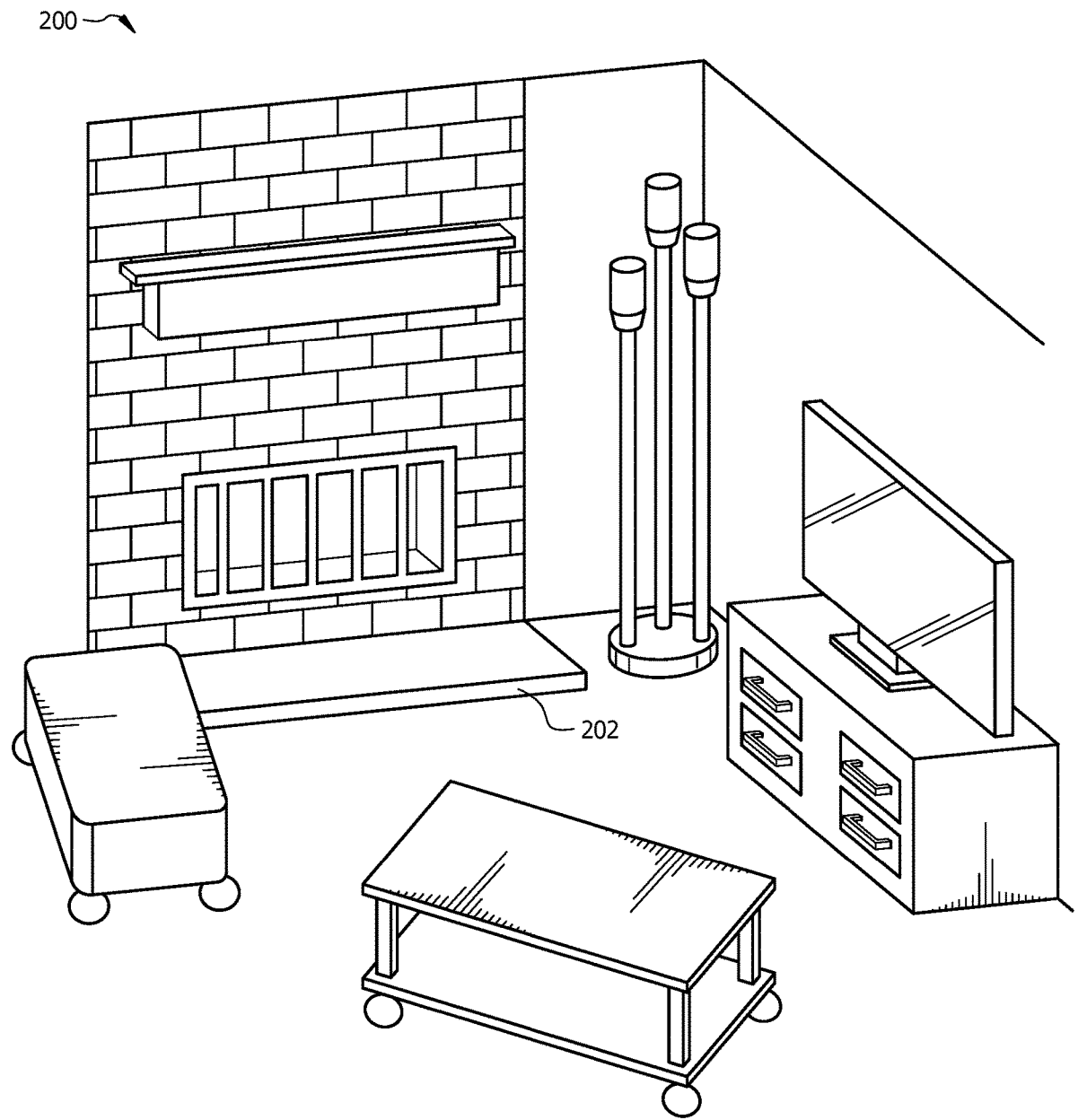
FIG. 2 is a diagram of a physical environment in accordance with aspects of the disclosure.

Referring now to FIG. 2, a diagram 200 of a physical environment is shown. The diagram 200 is generally representative of a residential living space, as seen through the viewfinder of a spatial computing device, as described above herein, that includes SLAM capability. In at least some examples, the physical environment may be scanned by the spatial computing device to create a plurality of meshes, point clouds, or other data types or structures that digitally represent the physical environment and which may be processed to create a digital 3D representation of at least part of the physical environment. In at least some examples, data generated according to a scan of the physical environment may be transmitted to a spatial computing hub or other server as 3D spatial data.

The spatial computing device may further determine a geographic location associated with the physical environment of the diagram 200. The geographic location may be determined according to any suitable process, including at least GPS location or radio triangulation. The spatial computing device may transmit the geographic location to the spatial computing hub for association and storage with the 3D spatial data in a spatial map file. The spatial computing device may further assign a Spatial Anchor in the physical environment. The Spatial Anchor may be any arbitrary point in space located near (e.g., within about 10 meters of) the physical environment. For example, the Spatial Anchor may be a physical element present in the physical environment. For example, the diagram 200 illustrates a Spatial Anchor 202 defined as a corner point of a structural feature of the physical environment. While only the Spatial Anchor 202 is shown in FIG. 2, any number of Spatial Anchors may be present and that may be located at any user-defined, or automatically selected or assigned, locations.

Figure 3:
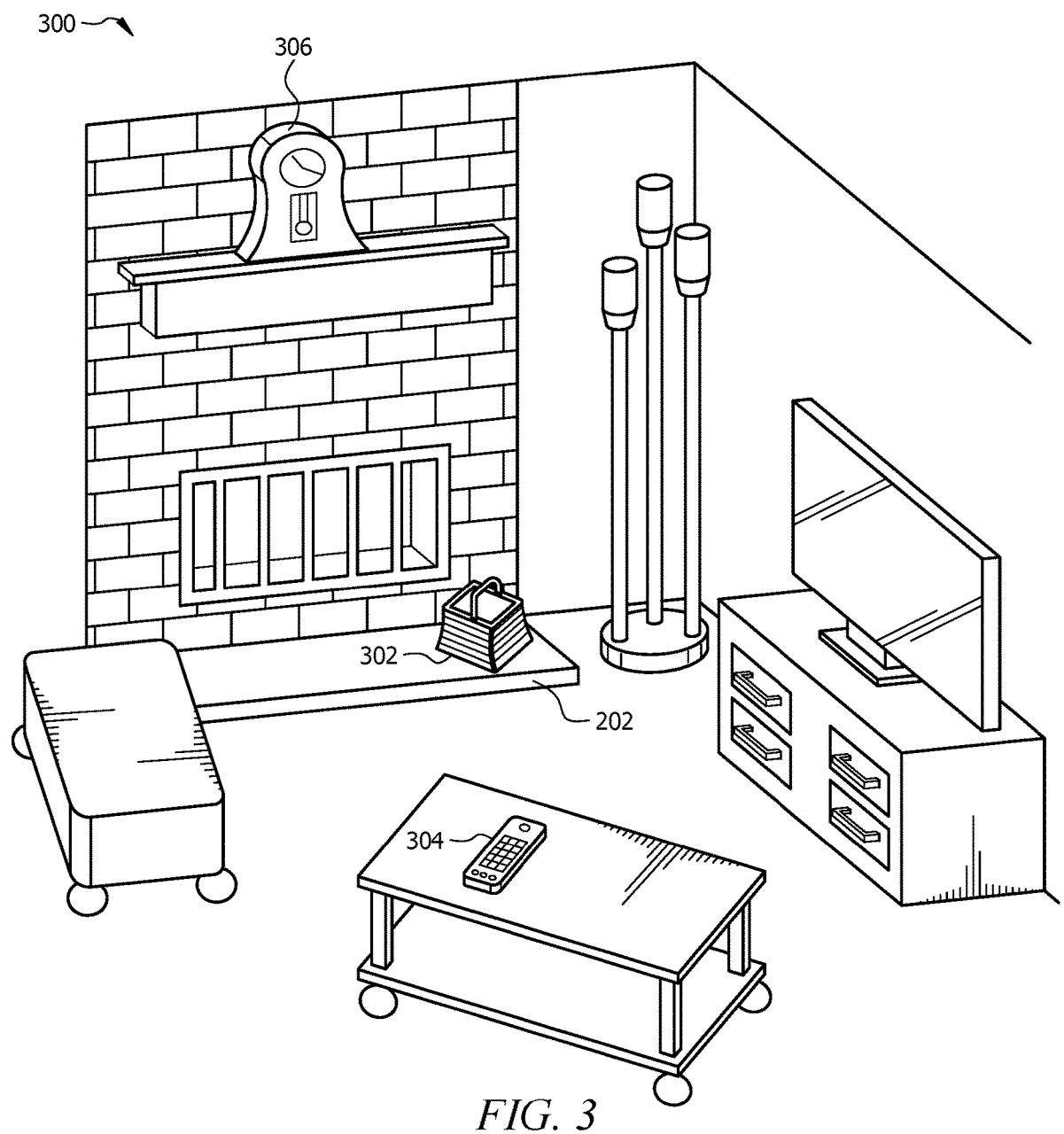
FIG. 3 is a diagram of an augmented reality (AR) environment in accordance with aspects of the disclosure.

Referring now to FIG. 3, a diagram 300 of an AR environment is shown. The diagram 300 is generally representative of a residential living space, as seen through the viewfinder of a spatial computing device, as described above herein, augmented with digital content to form the AR environment. For example, after scanning the physical environment depicted in FIG. 2, a user may interact with a spatial computing device to place digital content 302, 304, and 306 into an AR environment based on the physical environment. After the user places the digital content 302, 304, and 306 into the AR environment, the spatial computing device may transmit information related to the digital content 302, 304, and 306 to the spatial computing hub. For example, the spatial computing device may transmit location information of the digital content 302, 304, and 306 to the spatial computing hub, where the location information locates the digital content 302, 304, and 306 in the AR environment relative to the Spatial Anchor 202. The spatial computing device may further transmit information regarding properties of the digital content 302, 304, and 306, such as texture, color, size, interactivity, or any other suitable aesthetic or functional properties to the spatial computing hub. The spatial computing hub may store the information related to the digital content 302, 304, and 306 in the spatial map file along with the spatial map generated from the 3D spatial data and the identification of the Spatial Anchor.

When a user subsequently accesses the AR environment, either via a same spatial computing device as scanned the physical environment of the diagram 200 and placed the digital content 302, 304, and 306 in the AR environment in the diagram 300, or another device, the spatial computing hub may transmit information to enable the device to display the AR environment in substantially a same manner as shown in the diagram 300. For example, the spatial computing hub may transmit information to enable the device to display the AR environment in substantially a same manner as the AR environment was created by the user, placing the digital content 302, 304, and 306 later in a substantially same location as a user first placed and assigned the digital content 302, 304, and 306 when creating the AR environment.

Figure 4:
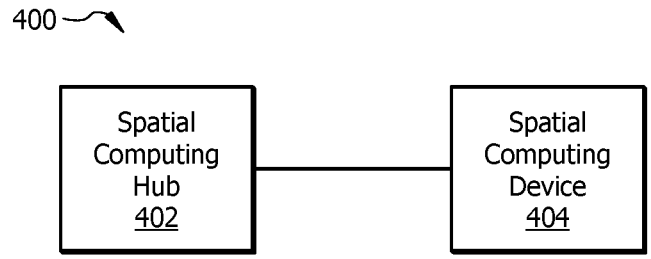
FIG. 4 is an example computing environment in accordance with aspects of the disclosure.

Referring now to FIG. 4, an example computing environment 400 is shown. In at least some examples, the computing environment includes a spatial computing hub 402 and a spatial computing device 404. The spatial computing hub 402 and the spatial computing device 404 may be communicatively coupled, either via a local area network (such as a wireless network within a building) or via a wide area network (such as the Internet). Accordingly, the spatial computing hub 402 and the spatial computing device 404 may be located in substantially a same physical location (e.g., a same room, a same building, etc.) or in different physical locations (e.g., the spatial computing hub 402 in a data center or other off-site location and the spatial computing device 404 in a different location). In at least some examples, the spatial computing hub 402 and/or the spatial computing device 404 may have hardware architectures as described above with respect to the computing device 100 of FIG. 1.

In at least some examples, the spatial computing device 404 communicates with the spatial computing hub 402 as described elsewhere herein according to one or more APIs. For example, the spatial computing device 404 may access or otherwise interact with various APIs of the spatial computing hub 402 to transmit information to the spatial computing hub 402 or to solicit information from the spatial computing hub 402. As described above, the spatial computing device 404 may scan a physical environment and provide 3D spatial data to the spatial computing hub 402. The spatial computing hub 402 may generate a spatial map based on the 3D spatial data and store the spatial map as, or in, a spatial map file. The spatial computing device 404 may further assign a Spatial Anchor in the physical environment and determine a physical location (e.g., geographic location) of the spatial computing device 404. The spatial computing device 404 may transmit information relating to the Spatial Anchor and the physical location of the spatial computing device 404 to the spatial computing hub 402, which may store the received information in the spatial map file. Via the spatial computing device 404, a user may place digital content into the physical environment, as viewed through a viewfinder of the spatial computing device 404, to create an AR environment based on the physical environment. The spatial computing device 404 may transmit information about the digital content to the spatial computing hub 402 for storing in the spatial map file. The information may include properties of the digital content such as scale, textures, etc., as well as location information (e.g., cartesian position and rotation information) of the digital content relative to a location of the Spatial Anchor previously assigned via the spatial computing device 404.

After the spatial map file is stored by the spatial computing hub 402, the spatial map file may be subsequently accessed via the spatial computing device 404 or by another device (not shown). For example, the spatial computing device 404 may implement a Live View, or other, application that enables a user to view and/or interact with the AR environment represented by the spatial map file via a viewfinder of the spatial computing device 404. In at least one implementation, when the Live View application is launched, the spatial computing device 404 may determine the geographic location of the spatial computing device 404 according to any suitable process and send the geographic location of the spatial computing device 404 to the spatial computing hub 402. Based on the geographic location of the spatial computing device 404, the spatial computing hub 402 may select a spatial map file corresponding to the geographic location of the spatial computing device 404 (which may account for some inaccuracy in geographic location determination). The spatial computing hub 402 may transmit the selected spatial map file to the spatial computing device 404.

The spatial computing device 404 may access the Spatial Anchor ID of the spatial map file and provide the Spatial Anchor ID to a Spatial Anchor API. The spatial computing device 404 may further capture one or more images and provide the one or more images to the Spatial Anchor API. Based on position and rotation information of the Spatial Anchor ID and the one or more images captured by the spatial computing device 404 and provided to the Spatial Anchor API, the Spatial Anchor API locates the Spatial Anchor ID in the physical environment and provides an indication of the location of the Spatial Anchor ID in the physical environment to the spatial computing device 404. Based on the identified location of the Spatial Anchor ID, the spatial computing device 404, such as via the Live View application, places the digital content included into an AR environment created according to the spatial map file and based on the previously scanned physical environment. The digital content is placed into the AR environment based on data of the spatial map file, at locations, both positionally and rotationally, relative to the identified location of the Spatial Anchor. In this way, the digital content is consistently located across multiple sessions of the Live View application both on different devices or on the same devices at different points in time.

Figure 5:
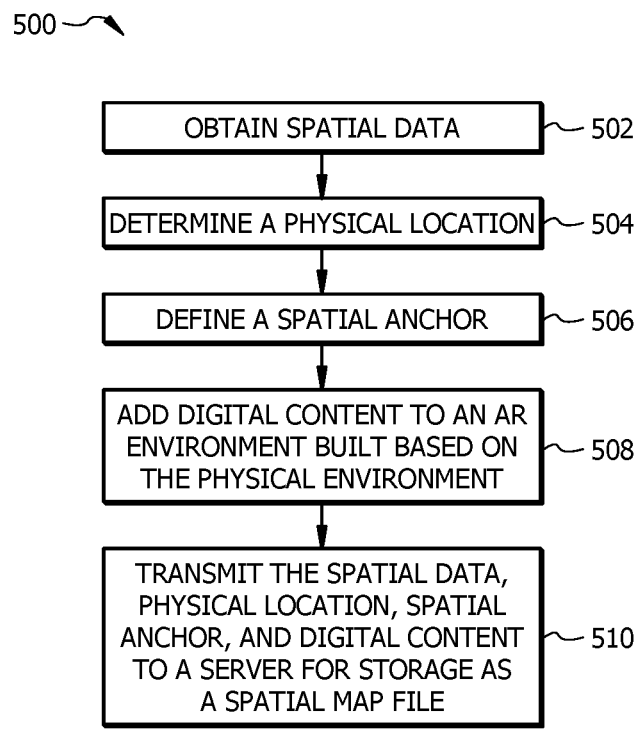
FIG. 5 is a flowchart of an example method in accordance with aspects of the disclosure.

Referring now to FIG. 5, a flowchart of an example method 500 is shown. In at least some examples, the method 500 is implemented at least partially by a spatial computing device, such as the spatial computing device 404 of FIG. 4. The method 500 is implemented, in some examples, to create an AR environment based on a physical environment, where the AR environment augments the physical environment with digital content when viewed through a viewfinder of a computing device.

At operation 502, spatial data is obtained. The spatial data is obtained, in some examples, by the spatial computing device. For example, the spatial computing device may be a SLAM capable device that performs a scan of a physical environment to obtain spatial data of the physical environment, perhaps using ARKIT by APPLE or ARCORE by GOOGLE. In other examples, the spatial computing device couples to a SLAM capable peripheral that performs a scan of a physical environment to obtain spatial data of the physical environment. In yet other examples, the spatial data of the physical environment is captured by a camera or other sensor of the spatial computing device or another peripheral coupled to the spatial computing device. The spatial data may be 3D data that represents the physical environment as one or more meshes, points clouds, or any other suitable data structures or elements that enable digital recreation and/or representation of the physical environment based on the spatial data.

At operation 504, a physical location is determined. The physical location is, for example, a physical location of the spatial computing device that is capturing, or captured, the spatial data of the physical environment at operation 502. Accordingly, in at least some examples, the physical location approximates a physical location of the physical environment. The physical location may be determined according to any suitable process, such as GPS, radio triangulation, etc. by the spatial computing device or a peripheral coupled to the spatial computing device. Alternatively, the physical location may be received by the spatial computing device as input from a user. The physical location may be represented, in at least some examples, as latitude and longitude coordinates.

At operation 506, a Spatial Anchor is defined. The Spatial Anchor is a point within the physical environment that will serve as a home point, or point of origin, for digital content added to the AR environment built based on the physical environment. The Spatial Anchor may be assigned a unique ID, and any number of Spatial Anchors may be defined in the physical environment. In an embodiment, the Spatial Anchor is an AZURE Spatial Anchor.

At operation 508, digital content is added to the AR environment built based on the physical environment. The digital content is content that is not viewable in the physical environment, is not physically tangible, but is viewable through a viewfinder of the spatial computing device when executing an AR application (such as a Live View application) that overlays the digital content over the physical environment as displayed on the viewfinder of the spatial computing device. The digital content may be located within the AR environment relative to the Spatial Anchor(s) defined at operation 506. For example, vector3 coordinates of the digital content and quaternion coordinates of the digital content may be relative to the position and rotation of the Spatial Anchor(s).

At operation 510, the spatial data, physical location, Spatial Anchor(s), and digital content are transmitted to a server for storage as a spatial map file. In at least some examples, the server is a spatial computing hub. The spatial computing device may interact with the server via one or more API calls to the server. In at least some examples, the AR environment as created by the spatial computing device at operation 508 is capable of recreation based on the spatial map file stored by the server according to the spatial data, physical location, Spatial Anchor(s), and digital content. When recreated, the digital content may appear in a same location as placed at operation 506 based on the digital content being located relative to the Spatial Anchor(s) defined at operation 506.

Figure 6:
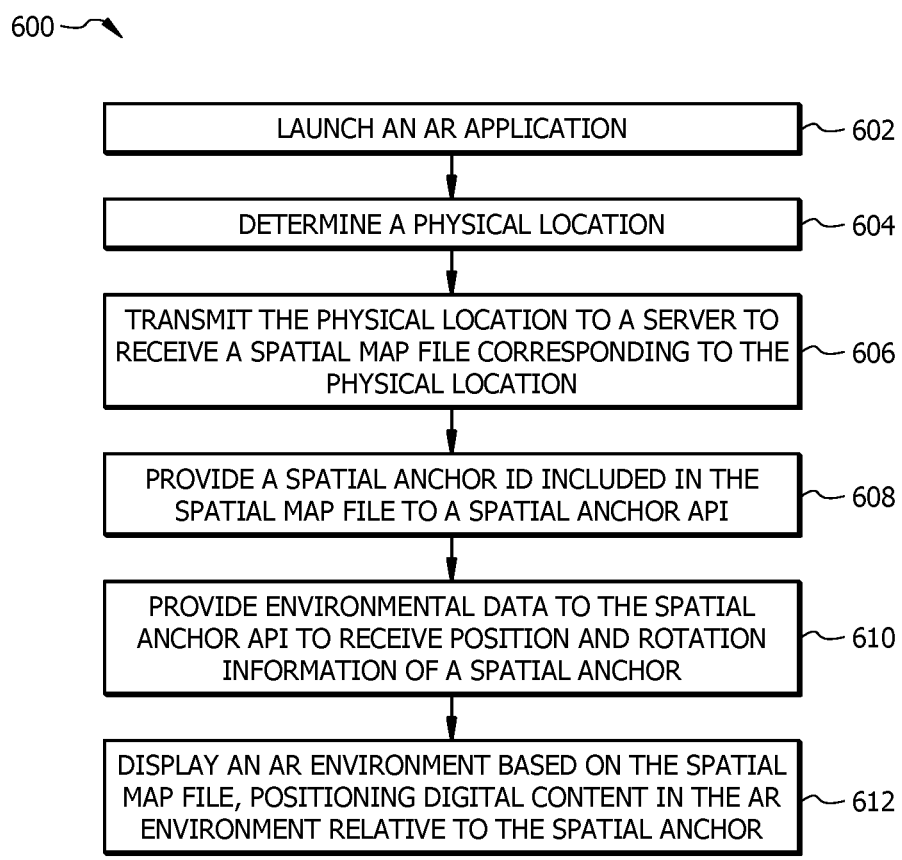
FIG. 6 is a flowchart of an example method in accordance with aspects of the disclosure.

Referring now to FIG. 6, a flowchart of an example method 600 is shown. In at least some examples, the method 600 is implemented at least partially by a spatial computing device, such as the spatial computing device 404 of FIG. 4. In other examples, the method 600 is implemented by a different spatial computing device (not shown) than the spatial computing device 404, and may have a different operating system (e.g., IOS or ANDROID) than the spatial computing device 404. The method 600 is implemented, in some examples, to re-localize the spatial computing device in a previously created AR environment, such as created according to the method 500 of FIG. 5 and stored as the spatial map file.

At operation 602, an AR application is launched. The AR application may be launched on a same spatial computing device as created the AR environment in which the spatial computing device will be re-localized. In other examples, the AR application may be launched on another spatial computing device that did not create the AR environment in which the spatial computing device will be re-localized. In yet other examples, the AR application is launched on multiple spatial computing devices and the following operations of the method 600 may be performed on each of the spatial computing devices that launch the AR application when in the same physical environment.

At operation 604, a physical location is determined. The physical location is, for example, a physical location of the spatial computing device on which the AR application was launched at operation 602. The physical location may be determined according to any suitable process, such as GPS, radio triangulation, etc. by the spatial computing device or a peripheral coupled to the spatial computing device. Alternatively, the physical location may be received by the spatial computing device as input from a user. The physical location may be represented, in at least some examples, as latitude and longitude coordinates.

At operation 606, the physical location is transmitted to a server that stores, or has access to, one or more spatial map files. The physical location may be transmitted to the server as a component of a request for the spatial map file, or data included in the spatial map file. The request may be transmitted to the server, in at least some examples, as, or in, an API call. Responsive to the request, the spatial computing device may receive a spatial map file, or at least some contents of a spatial map file, corresponding to the physical location.

At operation 608, a Spatial Anchor ID included in the data received at operation 606 is provided to a Spatial Anchor API. In some examples, the Spatial Anchor API is executing on the spatial computing device. In other examples, the Spatial Anchor API is executing on the server to which the physical location was transmitted at operation 606. In yet other examples, the Spatial Anchor API is executing on any other suitable device or server, such as a cloud server, a spatial computing hub, etc.

At operation 610, environmental data of a physical environment is provided to the Spatial Anchor API. The environmental data may be spatial data captured by the spatial computing device, photographs captures by the spatial computing device, or any other suitable environmental data. Based on the received environmental data and the Spatial Anchor ID, the Spatial Anchor API identifies or determines location information of the Spatial Anchor in the physical environment. The location information may include position information and rotation information. The Spatial Anchor API may provide the location information of the Spatial Anchor to the AR application.

At operation 612, the AR application displays the AR environment based on the physical environment and the spatial map file. Digital content identified in the spatial map file as being present in the AR environment may be placed in the AR environment by the AR application relative to the Spatial Anchor, as defined by the position and rotation information of the Spatial Anchor determined and provided at operation 610. In this way, the digital content is consistently located across multiple sessions of the AR application both on different devices or on the same devices at different points in time.

At least some aspects of the spatial computing device 404 or the spatial computing hub 402 may be further understood with reference to U.S. Provisional Patent Application No. 62/990,059, filed on Mar. 16, 2020 and titled "System and Method for Sensory Augmentation Including a Hub Device," and/or U.S. Provisional Patent Application No. 63/083,864, filed on Sep. 26, 2020 and titled "Spatially Aware Computing Hub and Environment," each of which is incorporated herein by reference in its entirety. Azure Spatial Anchors may be further explained and understood with reference to "Azure Spatial Anchors," published by Microsoft on Nov. 20, 2020, available at https://docs.microsoft.com/en-us/azure/opbuildpdf/spatial-anchors/toc.pdf as of Dec. 15, 2020, and which is hereby incorporated herein by reference in its entirety.

Additionally, while spatial anchors are sometimes referred to herein as Azure Spatial Anchors, Azure Spatial Anchors are only one suitable spatial anchor technology. The teachings of this disclosure are equally applicable to, and include, other forms and types of spatial anchors other than Azure Spatial Anchors. Thus, the present description is not limited to implementation using Azure Spatial Anchors.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Certain terms are used throughout the following description and claims to refer to particular system components. As one skilled in the art will appreciate, different companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct wired or wireless connection. Thus, if a first device couples to a second device, that connection may be through a direct connection or through an indirect connection via other intervening devices and/or connections. Unless otherwise stated, "about," "approximately," or "substantially" preceding a value means+/−10 percent of the stated value or reference.

What is claimed is:

1. A method, comprising:
   determining, via a user device, three-dimensional spatial data for a physical environment;
   determining a geographic location of the physical environment;
   assigning a Spatial Anchor in the physical environment;
   creating a digital element in an augmented reality environment created based on the spatial data of the physical environment, the digital element located in the augmented reality environment relative to a position of the Spatial Anchor;
   beginning, via the user device, a subsequent augmented reality session;
   re-localizing, via the user device, in the physical environment according to a two-step localization process including a coarse localization and a fine localization;
   receiving, by the user device, a spatial map file from a spatial computing hub, the spatial map file including the spatial data, the geographic location, information specifying the position of the Spatial Anchor, and information specifying a position of the digital element; and
   rendering an augmented reality environment, via the user device, based on the spatial map file.

2. The method of claim 1, further comprising transmitting the spatial data, the geographic location, information specifying the position of the Spatial Anchor, and information specifying a position of the digital element to a server to cause the server to store the spatial data, the geographic location, the information specifying the position of the Spatial Anchor, and the information specifying the position of the digital element as the spatial map file.

3. The method of claim 1, wherein the spatial computing hub:
   maintains localization of the user device in the physical environment; and
   transmits information of the localization to devices proximate to the spatial computing hub, including the user device.

4. The method of claim 1, wherein the coarse localization includes processing according to at least one of global positioning satellites (GPS), Time-of-flight, acoustic positioning, or radio triangulation, and wherein the fine localization includes processing according to at least one of image recognition, computer vision, or anchoring.

5. The method of claim 1, further comprising:
   identifying, via the user device or the spatial computing hub, structures of the physical environment represented in the three-dimensional spatial data; and
   replacing, via the user device or the spatial computing hub, at least some of the structures with interactive digital content, interactable with the user device.

6. The method of claim 1, wherein determining the three-dimensional spatial data include implementing, via the user device, a simultaneous localization and mapping (SLAM) process.

7. The method of claim 1, wherein the spatial computing hub stores the spatial map file that includes the spatial data, the geographic location, information specifying the position of the Spatial Anchor, and information specifying a position of the digital element, the method further comprising localizing, via the spatial computing hub and relative to a location of the spatial computing hub in the physical environment, at least the user device and a second device in the physical environment according to Time of Flight, Time of Arrival, Fine Time Measurement, or wireless signal triangulation.

8. A user equipment (UE) that renders a visual representation of an augmented reality environment, comprising:
   at least one non-transitory memory comprising an application; and
   at least one processor, wherein the UE is configured to execute the application to:
      determine three-dimensional spatial data for a physical environment;
      determine a geographic location of the physical environment;
      assign a Spatial Anchor in the physical environment;
      create a digital element in an augmented reality environment created based on the spatial data of the physical environment, the digital element located in the augmented reality environment relative to a position of the Spatial Anchor;
      begin a subsequent augmented reality session;
      re-localize in the physical environment according to a two-step localization process including a coarse localization and a fine localization;
      receive a spatial map file from a spatial computing hub, the spatial map file including the spatial data, the geographic location, information specifying the position of the Spatial Anchor, and information specifying a position of the digital element; and
      render the augmented reality environment based on the spatial map file.

9. The UE of claim 8, wherein the UE is configured to execute the application to transmit the spatial data, the geographic location, information specifying the position of the Spatial Anchor, and information specifying a position of the digital element to a server to cause the server to store the spatial data, the geographic location, the information specifying the position of the Spatial Anchor, and the information specifying the position of the digital element as the spatial map file.

10. The UE of claim 8, wherein the spatial computing hub:
    maintains localization of the UE in the physical environment; and
    transmits information of the localization to devices proximate to the spatial computing hub, including the UE.

11. The UE of claim 8, wherein the coarse localization includes processing according to at least one of global positioning satellites (GPS), Time-of-flight, acoustic positioning, or radio triangulation, and wherein the fine localization includes processing according to at least one of image recognition, computer vision, or anchoring.

12. The UE of claim 8, wherein the UE is configured to execute the application to:
    identify, via the UE or the spatial computing hub, structures of the physical environment represented in the three-dimensional spatial data; and replace, via the UE or the spatial computing hub, at least some of the structures with interactive digital content, interactable with the UE.

13. The UE of claim 8, wherein determining the three-dimensional spatial data include implementing, via the user equipment, a simultaneous localization and mapping (SLAM) process.

14. The UE of claim 8, wherein the spatial computing hub stores the spatial map file that includes the spatial data, the geographic location, information specifying the position of the Spatial Anchor, and information specifying a position of the digital element, the UE further configured to execute the application to localize, via the spatial computing hub and relative to a location of the spatial computing hub in the physical environment, at least the UE and a second device in the physical environment according to Time of Flight, Time of Arrival, Fine Time Measurement, or wireless signal triangulation.

15. A system, comprising:
a spatial computing device comprising:
  at least one non-transitory memory comprising an application; and
  at least one processor, wherein the spatial computing device is configured to execute the application to:
    determine three-dimensional spatial data for a physical environment;
    determine a geographic location of the physical environment;
    assign a Spatial Anchor in the physical environment;
    create a digital element in an augmented reality environment created based on the spatial data of the physical environment, the digital element located in the augmented reality environment relative to a position of the Spatial Anchor;
    begin a subsequent augmented reality session;
    re-localize in the physical environment according to a two-step localization process including a coarse localization and a fine localization;
    receive a spatial map file from a spatial computing hub, the spatial map file including the spatial data, the geographic location, information specifying the position of the Spatial Anchor, and information specifying a position of the digital element; and
    render an augmented reality environment based on the spatial map file; and
the spatial computing hub, communicatively coupled to the spatial computing device, wherein the spatial computing hub is configured to maintain and persist digital assets in the spatial map file, the digital assets having positions determined by multiple users, wherein a first portion of the digital assets for which a user of the spatial computing device has permissions are provided to the spatial computing device and a second portion of the digital assets for which the user of the spatial computing device does not have permissions are not provided to the spatial computing device.

16. The system of claim 15, wherein the spatial computing device is configured to execute the application to transmit the spatial data, the geographic location, information specifying the position of the Spatial Anchor, and information specifying a position of the digital element to a server to cause the server to store the spatial data, the geographic location, the information specifying the position of the Spatial Anchor, and the information specifying the position of the digital element as the spatial map file.

17. The system of claim 15, wherein the spatial computing hub:
  maintains localization of the spatial computing device in the physical environment; and
  transmits information of the localization to devices proximate to the spatial computing hub, including the spatial computing device.

18. The system of claim 15, wherein the coarse localization includes processing according to at least one of global positioning satellites (GPS), Time-of-flight, acoustic positioning, or radio triangulation, and wherein the fine localization includes processing according to at least one of image recognition, computer vision, or anchoring.

19. The system of claim 15, wherein the spatial computing device is configured to execute the application to:
  identify, via the spatial computing device or the spatial computing hub, structures of the physical environment represented in the three-dimensional spatial data; and
  replace, via the spatial computing device or the spatial computing hub, at least some of the structures with interactive digital content, interactable with the spatial computing device.

20. The system of claim 15, wherein the spatial computing hub stores the spatial map file that includes the spatial data, the geographic location, information specifying the position of the Spatial Anchor, and information specifying a position of the digital element, the spatial computing is further configured to execute the application to localize, via the spatial computing hub and relative to a location of the spatial computing hub in the physical environment, at least the spatial computing device and a second device in the physical environment according to Time of Flight, Time of Arrival, Fine Time Measurement, or wireless signal triangulation.

* * * * *